2 Sheets—Sheet 1.
M. NEWTON.
Vehicle-Spring Braces.
No. 196,536. Patented Oct. 30, 1877.
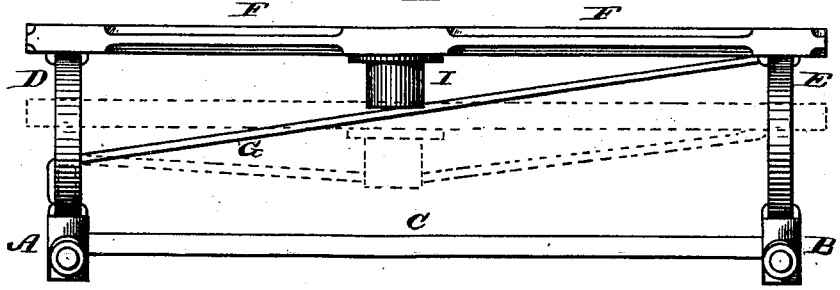
Fig. 1.
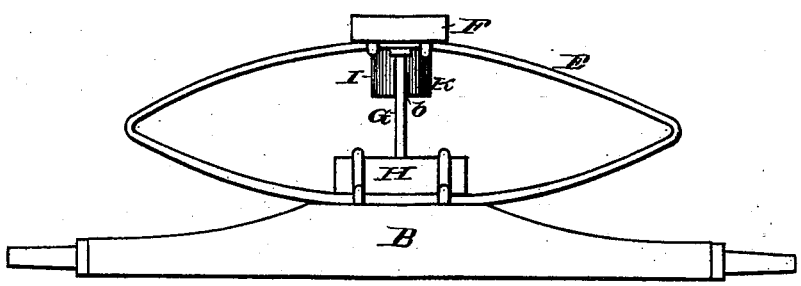
Fig. 2.
Fig. 4.
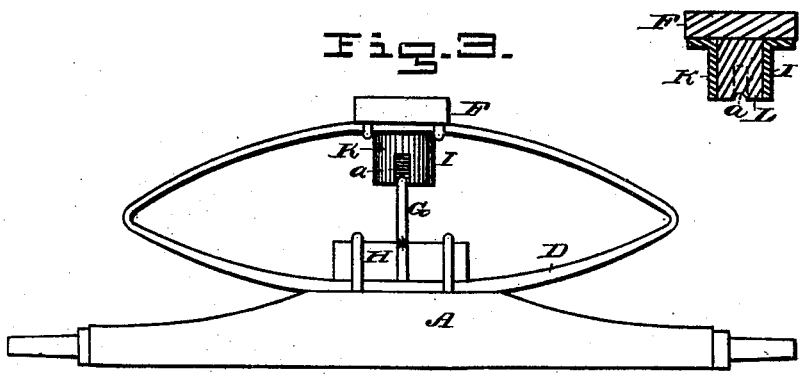
Fig. 3.
WITNESSES:
Jas. F. DuHamel
H. A. Brown
INVENTOR:
Madison Newton.
PER
H. S. Abbot.
ATTORNEY.

2 Sheets—Sheet 2.

M. NEWTON.
Vehicle-Spring Braces.

No. 196,536. Patented Oct. 30, 1877.

WITNESSES:
Jas. F. Duhamel
W. B. Brown

INVENTOR:
Madison Newton
PER
H. C. Abbot.
ATTORNEY.

N PETERS, PHOTO-LITHOGRAPHER, WASHINGTON, D C.

UNITED STATES PATENT OFFICE.

MADISON NEWTON, OF KENTLAND, INDIANA.

IMPROVEMENT IN VEHICLE-SPRING BRACES.

Specification forming part of Letters Patent No. 196,536, dated October 30, 1877; application filed August 24, 1877.

*To all whom it may concern:*

Be it known that I, MADISON NEWTON, of Kentland, in the county of Newton and State of Indiana, have invented certain new and useful Improvements in Spring-Braces for Vehicle; and I do hereby declare that the following is a full, clear, and exact description thereof.

This invention relates to certain improvements in springs for vehicle; and the invention consists in a spring-bearing arranged to neutralize the slack of a flexible stay when the springs are contracted; also, in the construction and arrangement of parts, as will be hereinafter more fully set forth.

In order to enable others skilled in the art to which my invention appertains to make, construct, and use the same, I will now proceed to describe its construction and arrangement, reference being had to the accompanying drawing, which forms a part of this specification, and in which—

Figure 5:
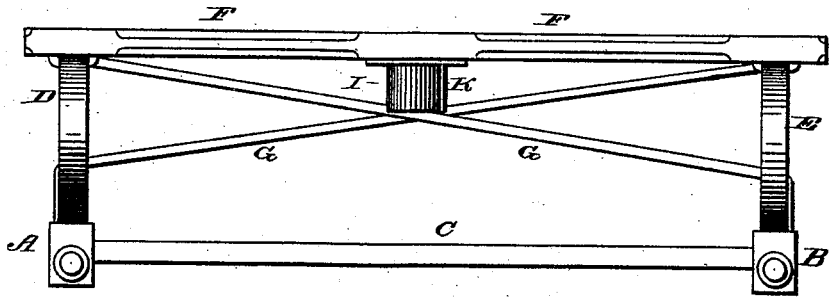
Figure 6:
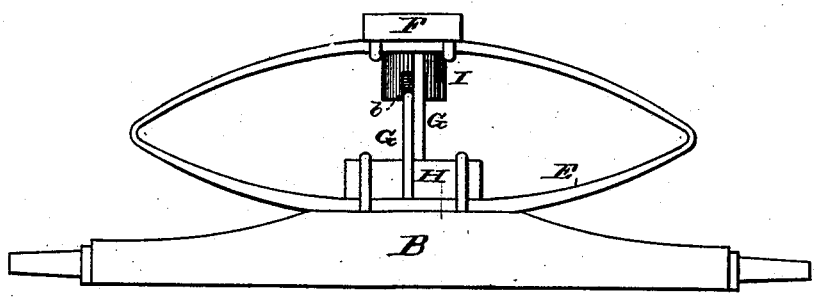

Figure 1 is a side elevation, showing in dotted lines the position of the device when the springs are loaded. Fig. 2 is a front elevation. Fig. 3 is a back elevation, showing the spring-bolster. Fig. 4 is a central vertical section through the bearing. Figs. 5 and 6 show my device when used with two rods instead of one.

A and B represent axles of any construction; C, an ordinary reach. D and E are ordinary elliptical springs secured to the axles in any suitable manner, and upon which the vehicle-body F rests.

To the bottom of the vehicle-body or the top of the spring, at the forward end, is secured one end of a flexible stay, G, which extends back to a bolster, H, of the spring D. This stay may extend from the forward end of the body back to the axle A, or other suitable place near the bottom of the spring D, and secured in any suitable manner; or one end may be secured to the top of the forward spring E, and extend back to the lower part of spring D, and this end be fastened in any desired way.

To the bottom of the vehicle, in any suitable place, preferably over the center of the stay, is attached a bearing, I, composed of a sleeve or housing, K, slotted at *a* and *b*, and containing a rubber spring, L.

Instead of a spring made of rubber, any other suitably elastic substance or spring may be used. The springs are always held in a vertical position, and when loaded they are prevented from leaning forward by the flexible stay and bearing.

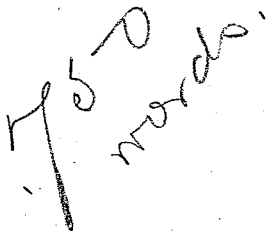

Having thus fully described my invention, what I claim as new, and desire to secure by Letters Patent, is—

1. In a vehicle, a spring-bearing, substantially as shown and described, arranged and operating to neutralize the slack of a stay, as shown.

2. The flexible stay, in combination with the spring-bearing, spring, and bolster, substantially as shown and described.

In testimony that I claim the foregoing as my own I affix my signature in presence of two witnesses.

MADISON NEWTON.

Witnesses:
 JOHN ADE,
 JOHN M. ARNOUT.